(12) United States Patent
Bowdry et al.

(10) Patent No.: US 7,945,401 B2
(45) Date of Patent: May 17, 2011

(54) DISTRIBUTED INTELLIGENT REMOTE TERMINAL UNITS

(75) Inventors: Richard James Bowdry, Delray Beach, FL (US); Jermaine Charles Edwards, Allen, TX (US); Jared Steven Scheuer, Williamson, NY (US); Jeffrey D. Taft, Canonsburg, PA (US); Lance Suijun Wang, Sugar Land, TX (US); Diane Elizabeth Wiggins, Houston, TX (US)

(73) Assignee: International Business Machines Corporation, Armonk, NY (US)

( * ) Notice: Subject to any disclaimer, the term of this patent is extended or adjusted under 35 U.S.C. 154(b) by 241 days.

(21) Appl. No.: 12/164,694

(22) Filed: Jun. 30, 2008

(65) Prior Publication Data

US 2009/0326731 A1 Dec. 31, 2009

(51) Int. Cl.
*G01R 21/00* (2006.01)
*G06F 17/40* (2006.01)

(52) U.S. Cl. ............... 702/60; 702/62; 700/22; 700/286

(58) Field of Classification Search ............... 702/60–62
See application file for complete search history.

(56) References Cited

U.S. PATENT DOCUMENTS

| | | | |
|---|---|---|---|
| 6,671,635 B1 * | 12/2003 | Forth et al. | 702/61 |
| 2002/0147503 A1 * | 10/2002 | Osburn, III | 700/9 |
| 2004/0138835 A1 * | 7/2004 | Ransom et al. | 702/62 |
| 2005/0216107 A1 * | 9/2005 | O'Donnell et al. | 700/82 |
| 2006/0193099 A1 * | 8/2006 | Schweitzer et al. | 361/115 |
| 2007/0018851 A1 * | 1/2007 | Ocondi | 340/870.11 |
| 2008/0219239 A1 * | 9/2008 | Bell et al. | 370/351 |
| 2009/0281674 A1 * | 11/2009 | Taft | 700/286 |

* cited by examiner

*Primary Examiner* — Hal D Wachsman
(74) *Attorney, Agent, or Firm* — Dillon & Yudell LLP

(57) ABSTRACT

Multiple autonomous intelligent Remote Terminal Units (RTUs) are positioned on distribution lines in an electrical power grid. The intelligent RTUs perform analytics on power flowing through the distribution lines to provide real-time analysis of the power. The intelligent RTUs acquire sensor data from the distribution lines and locally perform the analytics on the sensor data to create processed data signals that are transmitted to a control center server to facilitate power distribution monitoring of the electrical power grid.

17 Claims, 11 Drawing Sheets

US 7,945,401 B2

DISTRIBUTED INTELLIGENT REMOTE TERMINAL UNITS

BACKGROUND OF THE INVENTION

1. Technical Field

The present disclosure relates in general to the field of electricity distribution grids, and particularly to monitoring electricity distribution grids. Still more particularly, the present disclosure relates to intelligent remote terminal units used to monitor electricity distribution grids.

2. Description of the Related Art

Existing electricity distribution grids may be monitored using Remote Terminal Units (RTUs) with a Supervisory Control and Data Acquisition (SCADA) control system. Such standard RTUs are controlled by the SCADA control system, and provide limited sampling and processing of line sensor data, are difficult and expensive to scale, have high latency, have very limited time measurement capabilities (thus making synchronization technically difficult), and do not support fast reporting.

SUMMARY OF THE INVENTION

Multiple autonomous intelligent Remote Terminal Units (RTUs) are positioned on distribution lines in an electrical power grid. The intelligent RTUs perform advanced analytics on power flowing through the distribution lines, thus providing accurate real-time analysis of the power.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

Figure 1:
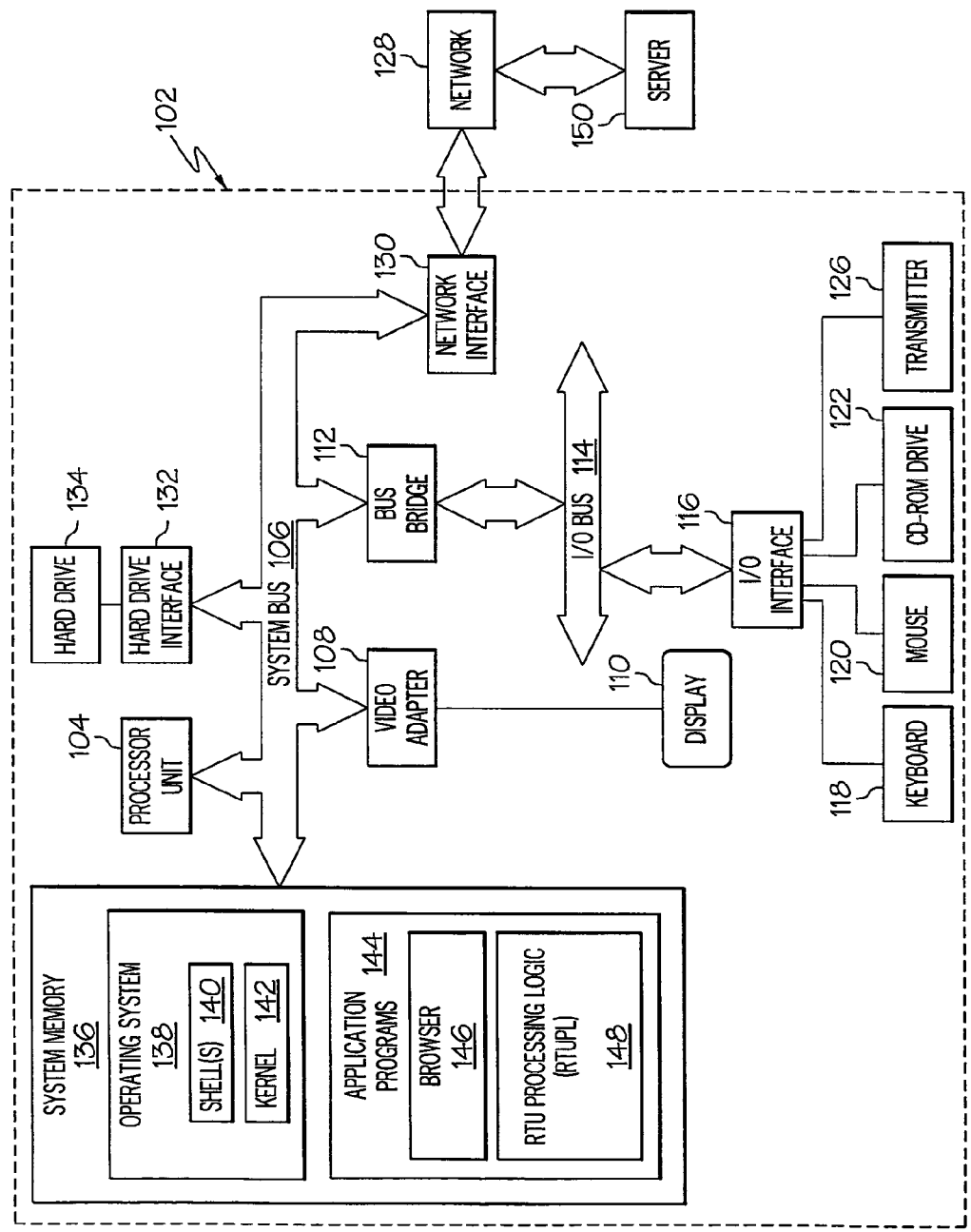
FIG. 1 illustrates an exemplary computer in which the present invention may be utilized.

With reference now to FIG. 1, there is depicted a block diagram of an exemplary computer 102, in which the present invention may be utilized. Note that some or all of the exemplary architecture shown for computer 102 may be utilized by software deploying server 150, control center server 216 (shown in FIG. 2), and/or substation server 410 (shown in FIG. 4).

Computer 102 includes a processor unit 104 that is coupled to a system bus 106. A video adapter 108, which drives/supports a display 110, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, a Compact Disk-Read Only Memory (CD-ROM) drive 122, a floppy disk drive 124, and a transmitter 126. Transmitter 126 may be a wire-based or wireless-based transmitter, configured to transmit a signal over a wire or a wireless signal (e.g., a radio wave). The format of the ports connected to I/O interface 116 may be any known to those skilled in the art of computer architecture, including but not limited to Universal Serial Bus (USB) ports.

Computer 102 is able to communicate with a software deploying server 150 via a network 128 using a network interface 130, which is coupled to system bus 106. Network 128 may be an external network such as the Internet, or an internal network such as an Ethernet or a Virtual Private Network (VPN). Note the software deploying server 150 may utilize a same or substantially similar architecture as computer 102.

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140 (also called a command processor) is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a browser 146. Browser 146 includes program modules and instructions enabling a World Wide Web (WWW) client (i.e., computer 102) to send and receive network messages to the Internet using Hyper-Text Transfer Protocol (HTTP) messaging, thus enabling communication with software deploying server 150.

Application programs 144 in computer 102's system memory (as well as software deploying server 150's system memory) also include a Remote Terminal Unit Processing Logic (RTUPL) 148. RTUPL 148 includes code for implementing the processes described in FIGS. 2-9B. In one embodiment, computer 102 is able to download RTUPL 148 from software deploying server 150, including in an "on demand" basis, as described in greater detail below in FIGS. 8A-9B. Note further that, in a preferred embodiment of the present invention, software deploying server 150 performs all of the functions associated with the present invention (including execution of RTUPL 148), thus freeing computer 102 from having to use its own internal computing resources to execute RTUPL 148.

The hardware elements depicted in computer 102 are not intended to be exhaustive, but rather are representative to highlight essential components required by the present invention. For instance, computer 100 may include alternate memory storage devices such as magnetic cassettes, Digital Versatile Disks (DVDs), Bernoulli cartridges, and the like. These and other variations are intended to be within the spirit and scope of the present invention.

Figure 2:
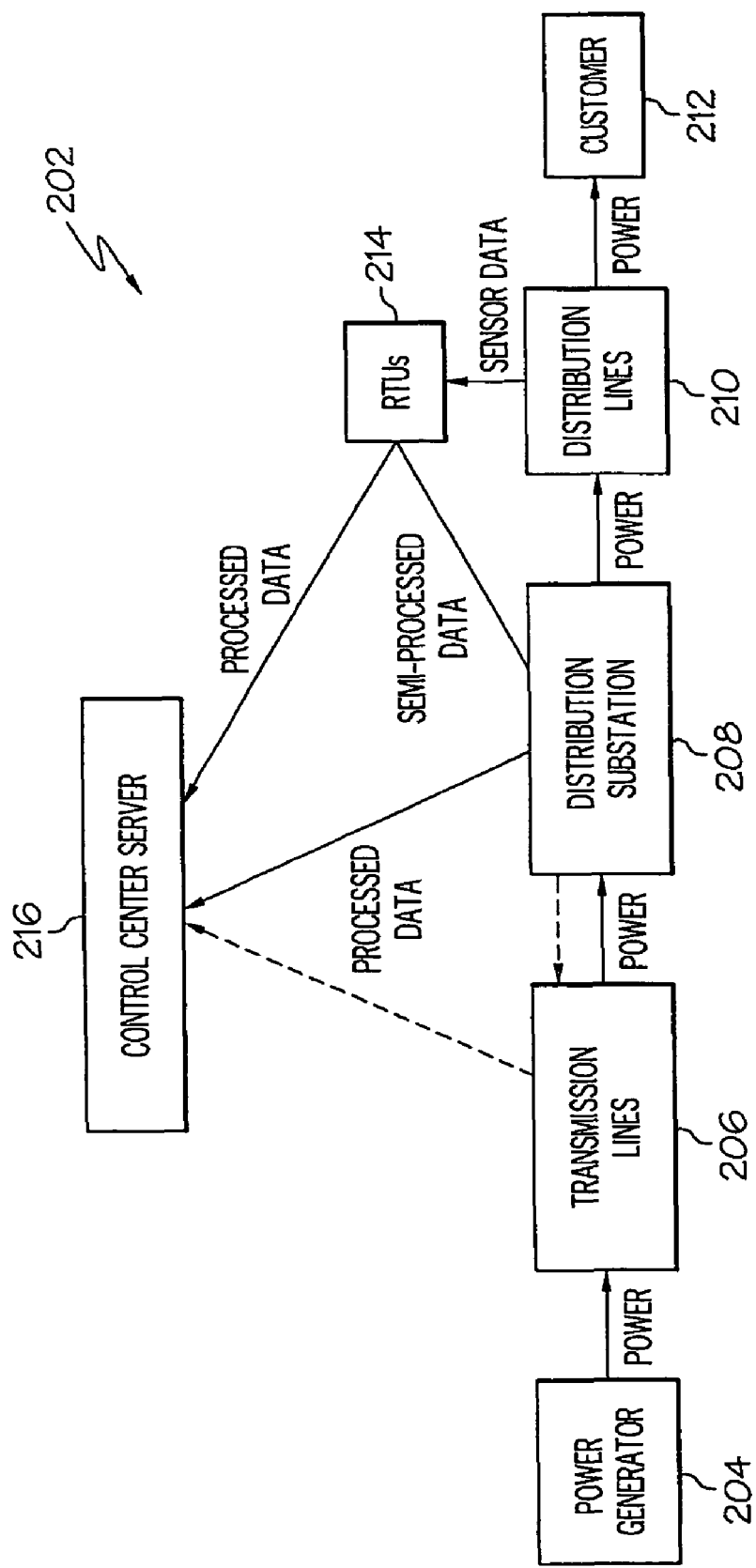
FIG. 2 depicts an electricity distribution grid that uses intelligent Remote Terminal Units (RTUs) that autonomously process signal data at a local level.

With reference now to FIG. 2, an exemplary electric power grid 202, having novel features described by the present invention, is presented. Electric power is initially generated by a power generator 204, which may be powered by water (hydroelectric), fossil fuel (e.g., coal powered), nuclear material (i.e., nuclear power), etc. The electrical power is then transmitted along transmission lines 206 (typically high voltage lines) to a distribution substation 208, which may step down the voltage before passing the power on to distribution lines 210. The distribution lines 210 may be sub-trunk lines within the distribution substation 208, sub-trunk lines coming out of (from) the distribution substation 208, and/or drop lines coming directly from a final step-down transformer (not shown), from which the power ultimately reaches a customer 212.

Remote Terminal Units (RTUs) 214, which may be placed in any type of distribution lines 210 described above, take quantitative and qualitative readings of sensor data describing the power. Some or all of the RTUs 214 may then process the sensor data, and forward the processed data to a server (e.g., substation server 410 shown below in FIG. 4) for further processing. Additionally, some or all of the RTUs 214 may be configured to more fully processing the sensor data (in a manner described below), and to transmitt the processed data directly to a control center server 216, which utilizes the processed data in a manner described below. Thus, some or all of the RTUs 214, known as standard RTUs, are configured to perform rudimentary signal processing (e.g., converting an analog reading of voltage or current into a digital signal), while other RTUs 214, known as intelligent RTUs, are configured to perform more complex processing (e.g., streaming waveforms, calculating power factors, etc.). Note that the transmission of processed and/or semi-processed data may be transmitted via any medium selected by the user, including, but not limited to, transmission along the transmission lines 206 and/or distribution lines 210 themselves, a separate data line (not shown), wireless transmission media (e.g., radio waves—not shown), etc. Note also that if the RTUs 214 are standard RTUs, then the local substation server 410 will be required to perform all local processing.

Figure 3:
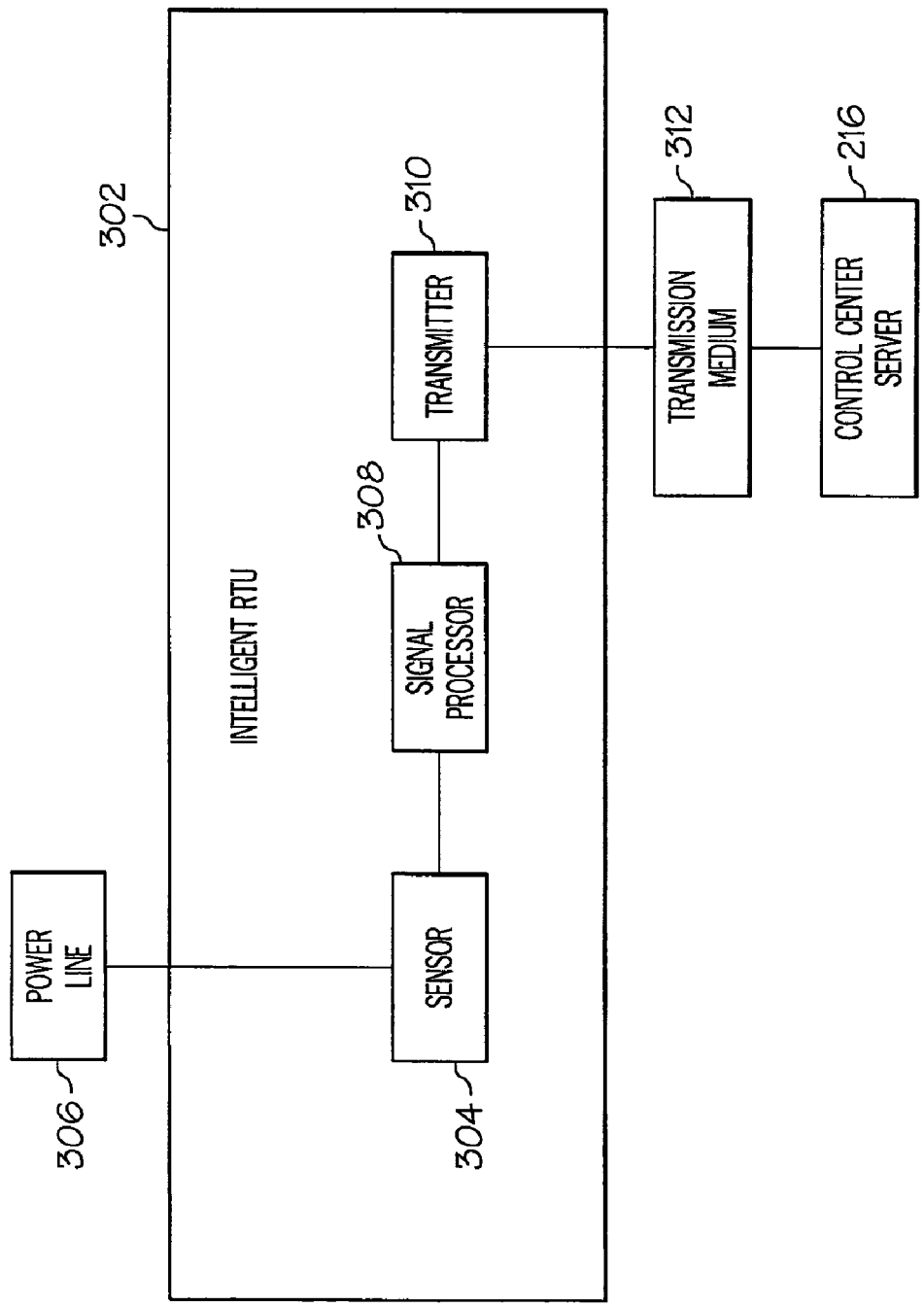
FIG. 3 illustrates an intelligent RTU couple to a power line.

With reference now to FIG. 3, an exemplary intelligent RTU 302 ("smart RTU"), as contemplated by the present invention, is presented. Intelligent RTU 302 includes a sensor 304, which monitors amperage, voltage, power, phase, and/or other characteristics of electrical power read from a power line 306 (e.g., distribution lines 210). The intelligent RTU 302 incorporates a signal processor 308, which is able to take readings from sensor 304 in order to discern advanced analytics of voltage and/or current and/or power using a discrete Fourier transform, an even-odd extraction, root mean square (RMS) of the current or voltage, total harmonic distortion (THD) of the voltage, an RMS/THD relation, a voltage crest factor, a current k-factor, triplens of the current, power factor, real power via dot product, arc detector, and digital filter, a Global Positioning System (GPS) time, etc. Exemplary formulas for calculating these values are shown in Table I:

TABLE I

RTU Mathematics

Preliminaries

1. Discrete Fourier transfom $$X_k = 1/N * \sum_{n=0}^{N-1} X_n e^{-j2\pi kn/N};$$

$1, \ldots N-1$

2. Even-odd extraction:  $x_e(n) = 1/2 * [x(n) + x * (-n)]$
    $x_o(n) = 1/2 * [x(n) - x * (-n)]$ 3. Parseval's relation:

$$\sum_{n=0}^{N-1} |x_n|^2 = 1/N * \sum_{k=0}^{N-1} |x_k|^2$$

RTU function definitions 4. root mean square (rms):

$$x_{rms} = \left[1/N * \sum_{n=0}^{N-1} x_n^2\right]^{1/2}$$

5. Total harmonic Distortion (THD):

$$\left[\sum_{h>1}^{h_{max}} |X_h|^2\right]^{1/2} / |X_1|;$$

number, h = 1 => 60 Hz fundamental 6. rms/THD relation:  $THD = [x_{rms}^2/|X1|^2 - 1]^{1/2}$
7. crest factor:  $x_{peak}/x_{rms}$ 8. k-factor:

$$\sum_{h=1}^{h_{max}} h^2 (I_h/I_1)^2$$

definition); h = harmonic number, I = current spectral element 9. rms triplens current:

$$1/N\left[\sum_{k=0}^{h_{max}} |I_{6k+3}|^2\right]^{1/2};$$

triplens current spectral element 10. power factor:  $\dfrac{real\_power}{apparent\_power} = \dfrac{\cos\phi}{[1+THD^2]^{1/2}};$
    $\cos\phi$ is power factor at 60 Hz
11. real power via dot product:  $P_k = V_k \cdot I_k = |V_k||I_k|\cos\phi = reV_k * reI_k + imV_k * imI_k$
12. reactive power via cross product:  $Q_k = V_k \times I_k = |V_k||I_k|\sin\phi = reV_k * imI_k - imV_k * reI_k$
13. arc detector:  $D1 = [crest\ factor * (1 + THD)]$
14. digital filter:  $y_n = 0.7\ y_{n-1} + 0.3\ x_n$ All calculations described above can be calculated by the signal processor 308 in the intelligent RTU 302, or by a dedicated processing logic devoted only to performing such calculations. Some or all of these calculations can also be performed by substation server, shown and described in detail below in FIGS. 4-5.

Continuing with FIG. 3, once the signal processor 308 processes the sensor data from one or more sensors 304 associated with the intelligent RTU 302, the processed data is then sent to a transmitter 310 (e.g., transmitter 126 shown in FIG. 1), which transmits the processed data, via a transmission medium 312 (e.g., transmission lines 206, a wireless signal, etc.), to the control center server 216.

Figure 4:
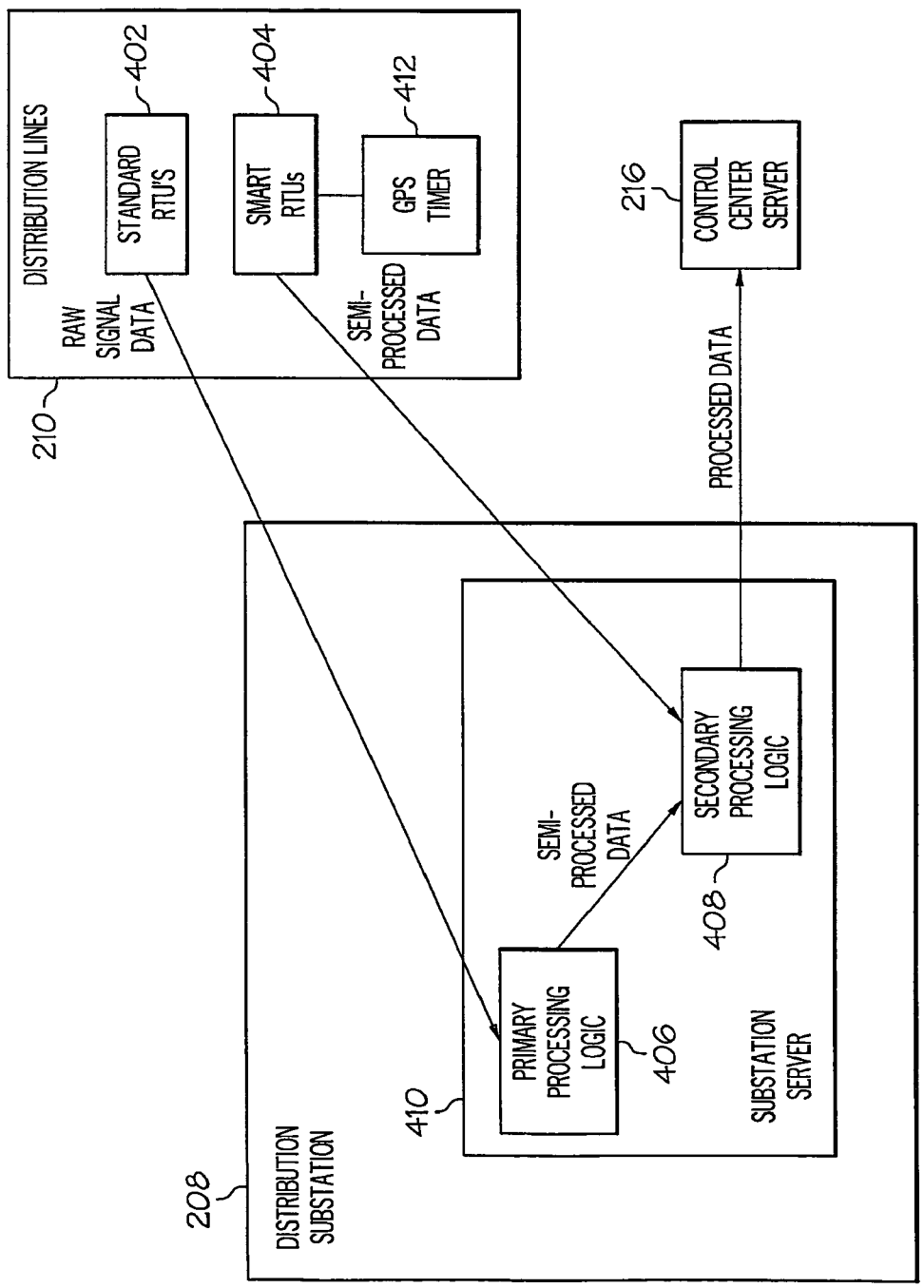
FIG. 4 depicts detail of an interaction between distribution line RTUs and a distribution substation.

With reference now to FIG. 4, note that standard RTUs 402 and/or smart RTUs 404 (e.g., as described above for intelligent RTU 302 in FIG. 3) are positioned to take readings from power lines, including the distribution lines 210 described above. If a standard RTU 402 is utilized, then the standard RTUs 402 perform only rudimentary signal processing. Alternatively, RTUs 402 may be replaced by only sensors (not shown, but similar to sensor 304 described in FIG. 3), which send raw signal data to a primary processing logic 406 in a substation server 410 for processing. The processed data (from the smart RTUs 404 and/or the primary processing logic 206) is then sent to a secondary processing logic 408, which is logic that computes, for all three phases of power, arc signal, total apparent power, phase impedance, and fault distance (using formulas shown below in Table II), as well as phasors (represented in polar form as magnitude/angle pairs) showing relationships between phases in multi-phase power.

TABLE II

Arc signal = crest factor * (1 + THD)
Total Apparent Power = Vrms * Irms
Phase impedance = v/i * {P/|P + jQ| + jQ/|P + jQ|, where
v = voltage
i = current
P = power
jQ = reactive power at 60 Hz
Fault distance (stated in feet, and based on phase impedance per foot of transmission line)

As shown in FIG. 4, this processed data can then be sent from the secondary processing logic 408 to the remotely located control center server 216.

Note also that a Global Positioning System (GPS) timer 412 may be associated with one or more of the smart RTUs 404. GPS timer 412 takes advantage of the fact that every GPS satellite has on-board atomic clocks, which generate GPS time (which does not match time based on the rotation of the earth). This GPS time provides a level of accuracy needed to generate timing signals and timing tags used to coordinate activities among RTUs. That is, assume that multiple intelligent RTUs directly interact to perform advanced analytics on sensor data from the multiple intelligent RTUs (e.g., using an analytics engine 502 describe in FIG. 5). GPS timer 412 supplies the requisite level of time accuracy needed for this coordinated advanced analytics process.

Figure 5:
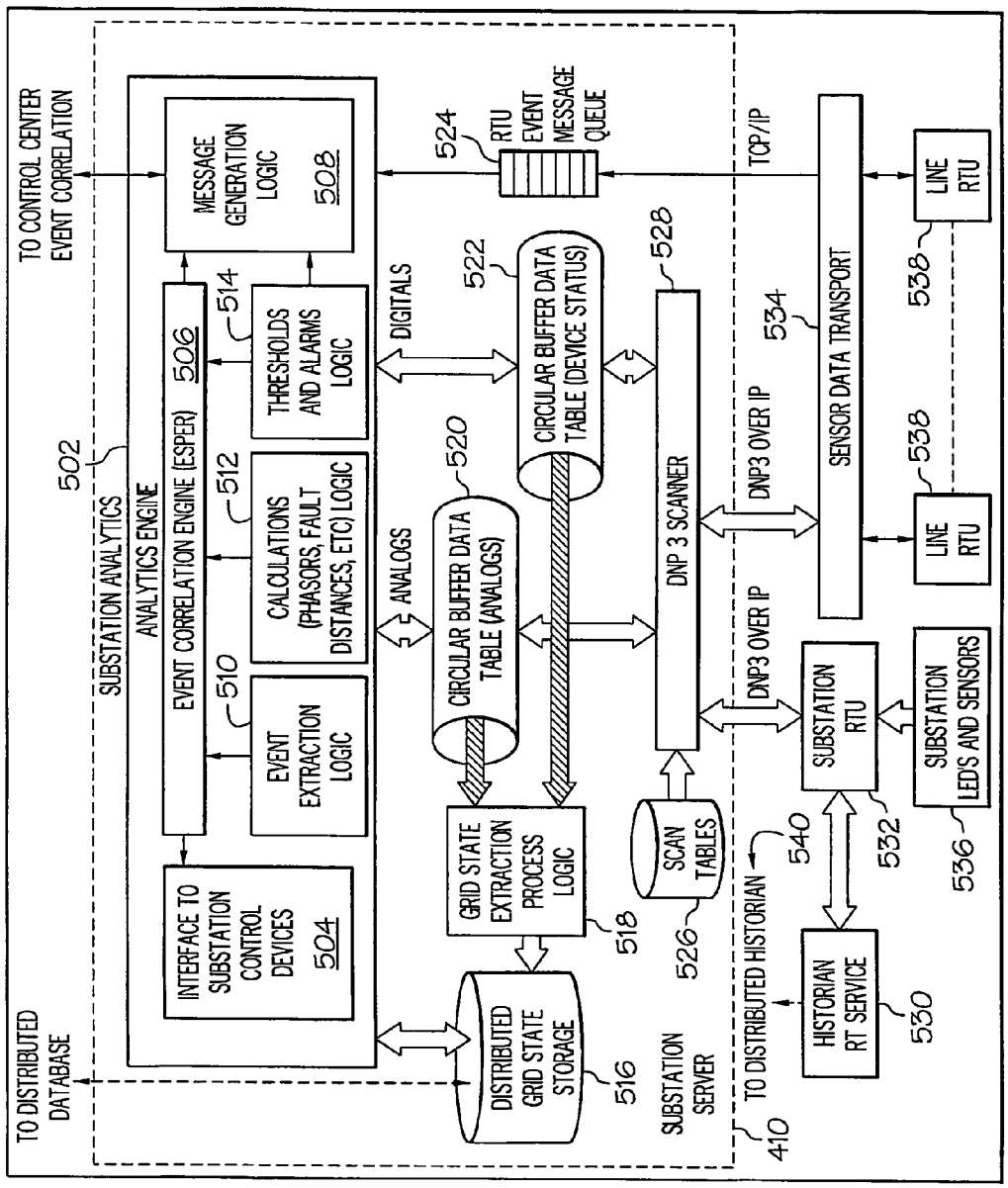
FIG. 5 illustrates additional detail of a substation server shown in FIG. 4.

Referring now to FIG. 5, additional detail for processing logic in the substation server 410 is presented. The substation server 410 includes logic for performing advanced substation analytics, which in one embodiment, are the same advanced analytics that are performed by the signal processor 308 in the intelligent RTU 302, which utilizes one or more of the analytics engine 502, interface to substation control devices 504, event correlation engine 506, message generation logic 508, event extraction logic 510, calculations logic 512, thresholds and alarms logic 514, distributed grid extraction process logic 516, circular buffer data table 520, circular buffer data table 522, RTU event message queue 524, scan table 526, and Distributed Network Protocol—Three (DNP3) scanner 528.

As shown in FIG. 5, sensor data is received by line RTUs 538 (which may be intelligent RTUs, and thus already have some or all of the internal logic described above for substation server 410). Alternatively, RTUs 538 may merely be standard sensors that are incapable of the advanced analytics described above. Similarly, sensor data (either processed or unprocessed) may be received from inside a distribution substation (e.g., distribution substation 208 shown in FIG. 2), using substation Intelligent Electronic Devices (IEDs—"smart RTUs") and sensors 536. This sensor data is sent to a substation RTU 532 for further processing, before being sent to a local historian Remote Terminal (RT) service 530, which provides sensor data (processed if from an intelligent or standard RTU, or unprocessed if from a naked sensor) to a distributed historian 540. The substation RTU 532, like a sensor data transport 534 is able to send sensor data (raw, semi-processed, or processed) to the DNP3 scanner 528, which scans for data from the RTU sensors. Note that DNP3 scanner 528 utilizes the DNP3 protocol, which is a layer 2 protocol that is able to check for data errors (prevalent in power transmission of "dirty" power) through a heavy use of Cyclic Redundancy Checks (CRCs) embedded in data packets from the RTU sensors.

DNP3 scanner 528 stores receives information from scan tables 526, which help the DNP3 scanner 528 identify which RTUs are sending data to the DNP3 scanner 528. The DNP3 scanner 528 sends the sensor data (raw, semi-processed, processed) to a circular buffer data table 520 (for analog data, such as an analog wave signal from a sensor or RTU) and/or a circular buffer data table 522 (for digital data, such as digitized information describing a status of a sensor or RTU). This information is sent to a grid state extraction process logic 518, which passes the data on to a distributed grid state storage 516.

Sensor data from the circular buffer data table 520, circular buffer data table 522, and/or an RTU event message queue 524 is sent to the analytics engine 502. The analytics engine is able to perform the advances analytics described above in Tables I and II. For example, event extraction logic 510 is able to identify a particular event from sensor data received from an RTU. Such a particular event may be a power signal being "dirty" from line induction, etc. This "dirty" power is recognized by the event extraction logic 510, and sent to an event correlation engine 506, which is able to correlate this particular event with other events from (the same or other RTUs) to recognize a wide-spread problem. Similarly, calculations logic 512 is able to perform the calculations described above in Tables I and II, in order to perform the advanced analytics discussed above. Note again that these advanced analytics can be performed within the intelligent RTUs themselves (e.g., intelligent RTU 302 shown in FIG. 3 and smart RTUs 404 Shown in FIG. 4), thus making these RTUs autonomously able to provide rapid, high-rate (e.g., take 256 samples per cycle) sensor evaluations and advanced analytics. By making these intelligent RTUs perform such advanced analytics, timing problems, staleness (of data) problems, etc., which would be prevalent in a centralized analytical engine system, are eliminated or reduced.

Continuing with FIG. 5, note that thresholds and alarms logic 514 can also generate alarms (based on simple threshold monitoring of data signals from the RTUs), which can result in a message generation logic 508 producing and transmitting an alarm message to a control center event correlation (e.g., a control center server 216, such as shown in FIG. 2).

Note also that the event correlation engine 506 can transmit processed data (from or processed by the RTUs) to an interface 504 to substation control devices. Interface 504 thus provides processed analytical data to control devices such as switching gear, power controls, meters, etc. (not shown), based on the advanced analytics performed on the sensor data.

Note that, in a preferred embodiment, the data from the RTUs is sent to the DNP3 scanner using Internet Protocol (IP), thus requiring the DNP3 scanner 528 to have a unique IP address. Similarly, the RTU event message queue 524 uses Transmission Control Protocol/Internet Protocol (TCP/IP), thus making transmission possible over the World Wide Web.

Figure 6:
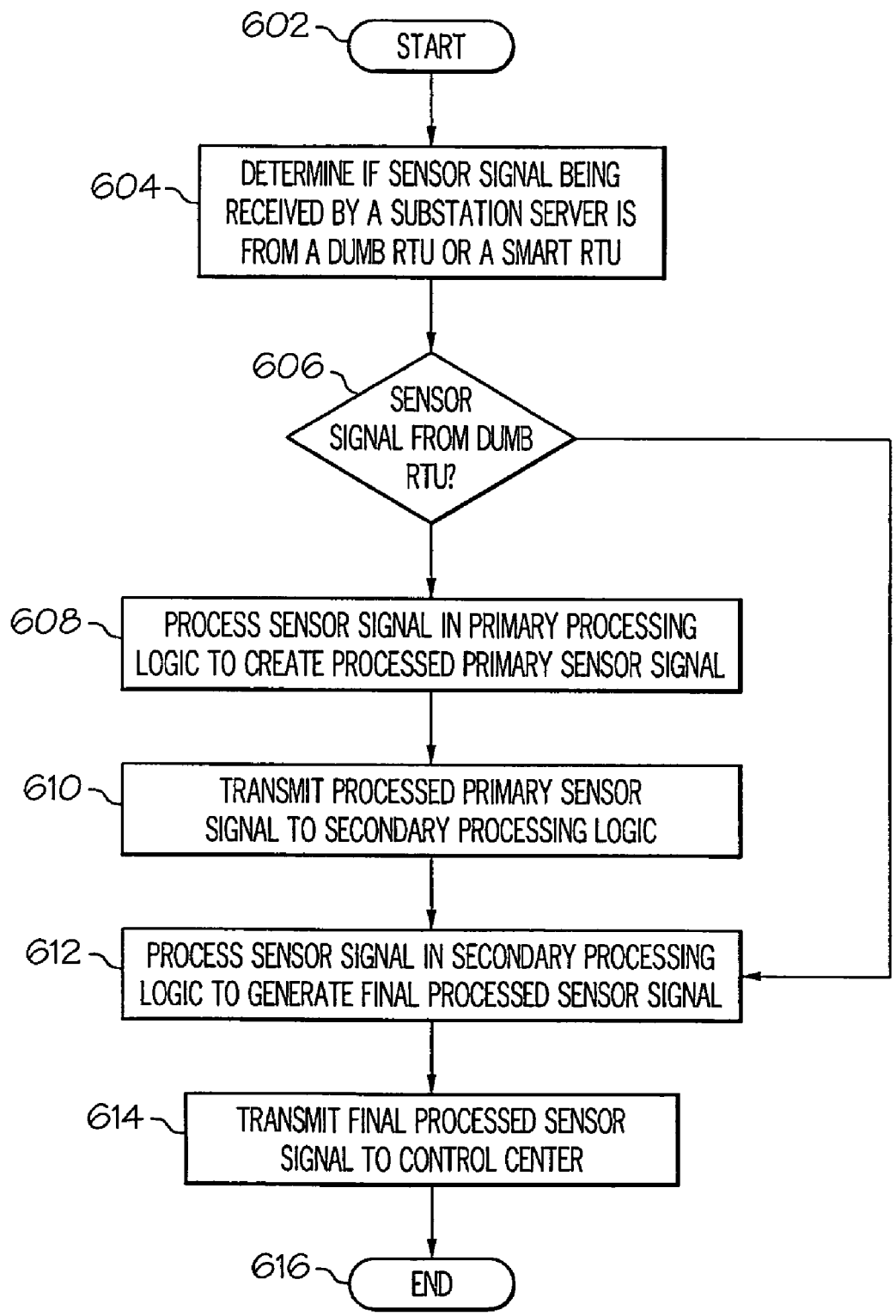
FIG. 6 is a high-level flow-chart describing how to utilize intelligent RTUs in an electricity distribution grid.

With reference now to FIG. 6, a high-level flow-chart of steps taken to utilize intelligent RTUs, which perform advanced analytics of electrical power being transmitted, to monitor and control such transmission, is presented. After initiator block 602, a determination is made as to whether an RTU that is monitoring a power line is dumb or smart (query block 606). If the RTU is a standard RTU (or else is just a sensor), then primary processing, of the sensor data, is performed by (block 608) and transmitted from (block 610) a primary processing logic (e.g., primary processing logic 406 shown in FIG. 4). If the RTU is smart, then the primary processing has already been performed (e.g., calculations shown above in Table I), and thus only secondary processing is needed (e.g., calculations shown in Table II), as describe in block 612. The finally processed signal, having advanced analytics performed thereon, is then sent to a remotely located control center (block 614), and the process ends (terminator block 616).

Figure 7:
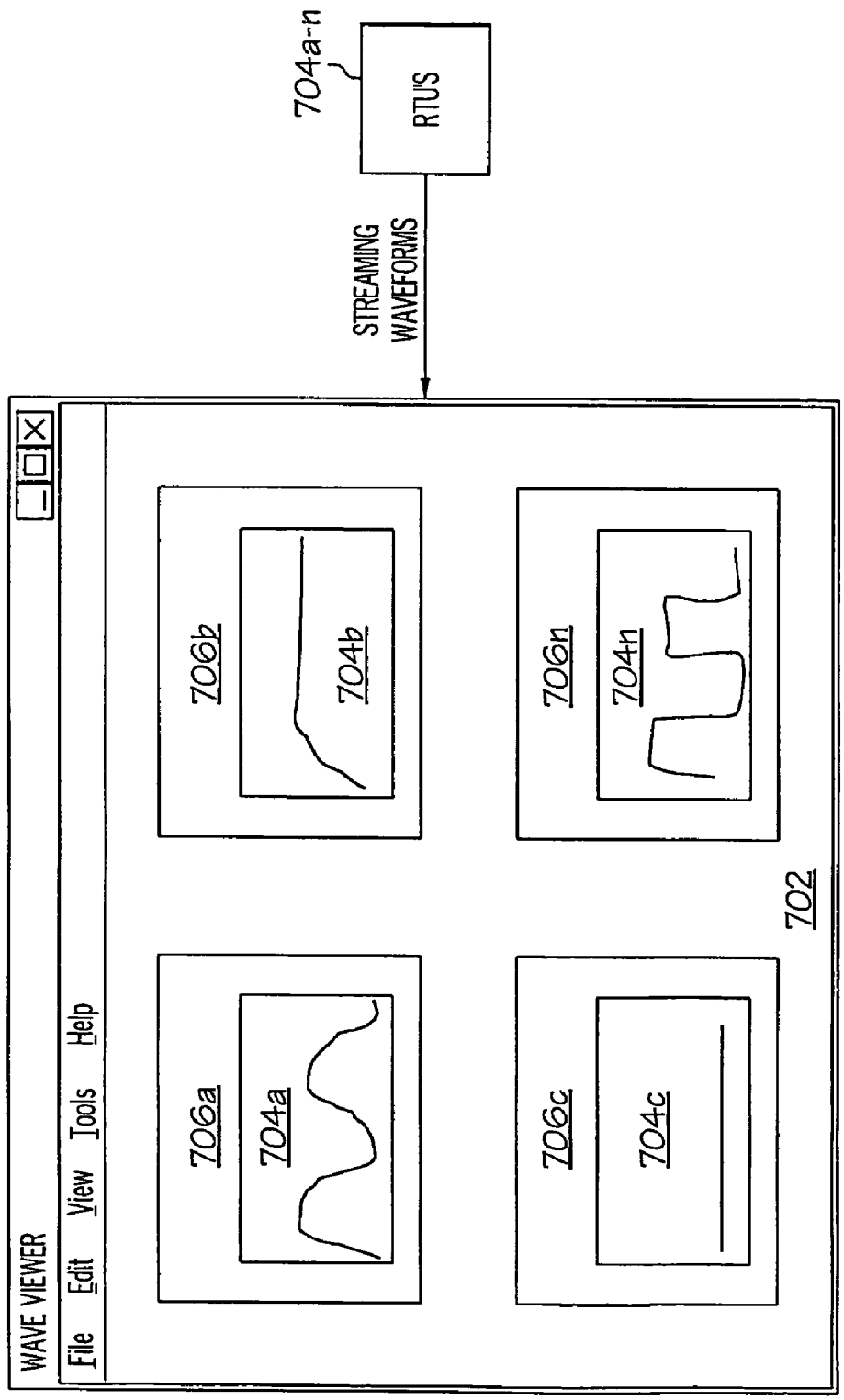
FIG. 7 illustrates a Graphical User Interface (GUI), on a remote control center's computer, for displaying multiple real-time waveforms describing electricity being monitored by multiple RTUs on the electricity distribution grid.

The advanced analytics (described in block 612) may include discerning components of voltage or current using a discrete Fourier transform, an even-odd extraction, root mean square (RMS) of the current or voltage, total harmonic distortion (THD) of the voltage, an RMS/THD relation, a voltage crest factor, a current k-factor, triplens of the current, power factor, real power via dot product, arc detector, and digital filter, a Global Positioning System (GPS) time, etc. In addition, such advanced analytics can also accomplish a real-time waveform streaming and display. For example, assume, as shown in FIG. 7, that a Graphical User Interface (GUI) 702, displayed on a control center server 216 (shown in FIG. 2) is receiving streaming waveforms from multiple (intelligent) RTUs 704*a-n* (where "n" is an integer). These streaming waveforms can be generated by taking an analog signal from sensors in the RTUs 704*a-n*, and digitizing these waveforms using Analog to Digital Converters (ADCs—not shown) in the RTUs 704*a-n*. These digital packets are then streamed in real-time to the GUI 702, resulting in corresponding real-time graphs 706*a-n*. A supervisor, watching the GUI 702 on the control center server 216, is thus able to determine if power on a particular line is normal (e.g., has a normal sine wave as shown in real-time graph 706*a*), is frozen at a high-voltage (real-time graph 706*b*), is "dead" (real-time graph 706*c*), or is demonstrating an unexpected waveform due to clipping (e.g., the chopped wave shown in real-time graph 706*n*). Note that some or all of the real-time graphs 706*a-n* would not be possible if advanced analytics were performed at the control center server 216, since too much time would be required to receive sensor data from the various RTUs, particularly if such data was taken at a high rate (e.g., 256 times a second).

It should be understood that at least some aspects of the present invention may alternatively be implemented in a computer-readable medium that contains a program product. Programs defining functions of the present invention can be delivered to a data storage system or a computer system via a variety of tangible signal-bearing media, which include, without limitation, non-writable storage media (e.g., CD-ROM), writable storage media (e.g., hard disk drive, read/write CD ROM, optical media), as well as non-tangible communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

Software Deployment

As described above, in one embodiment, the processes described by the present invention, including the functions of RTUPL 148, are performed by service provider server 150. Alternatively, RTUPL 148 and the method described herein, and in particular as shown and described in FIGS. 2-7, can be deployed as a process software from service provider server 150 to computer 102. Still more particularly, process software for the method so described may be deployed to service provider server 150 by another service provider server (not shown).

Figure 8A:
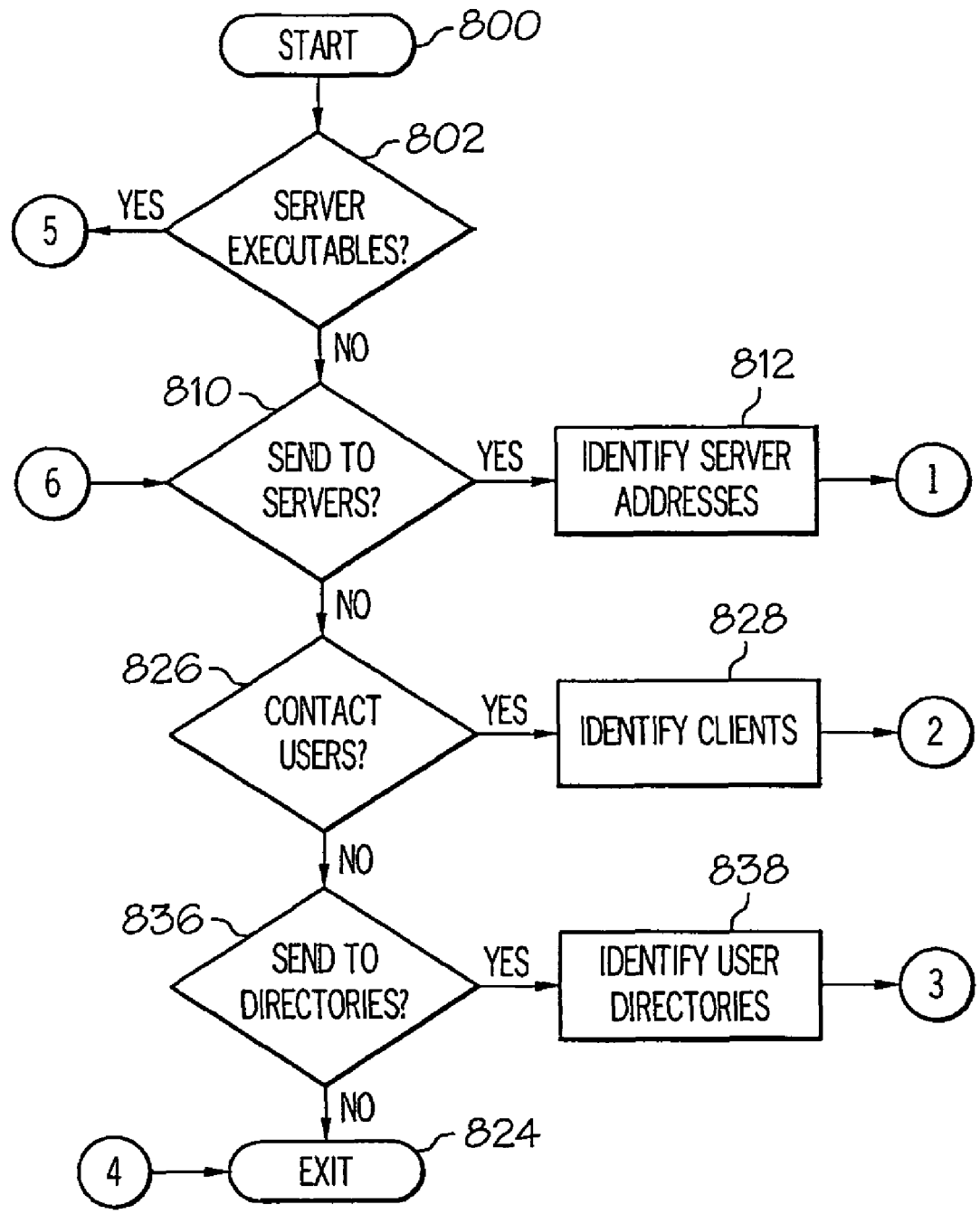
FIGS. 8A-8B are flow-charts showing steps taken to deploy software configured to execute the steps and processes described in FIGS. 2-7.
Figure 8B:
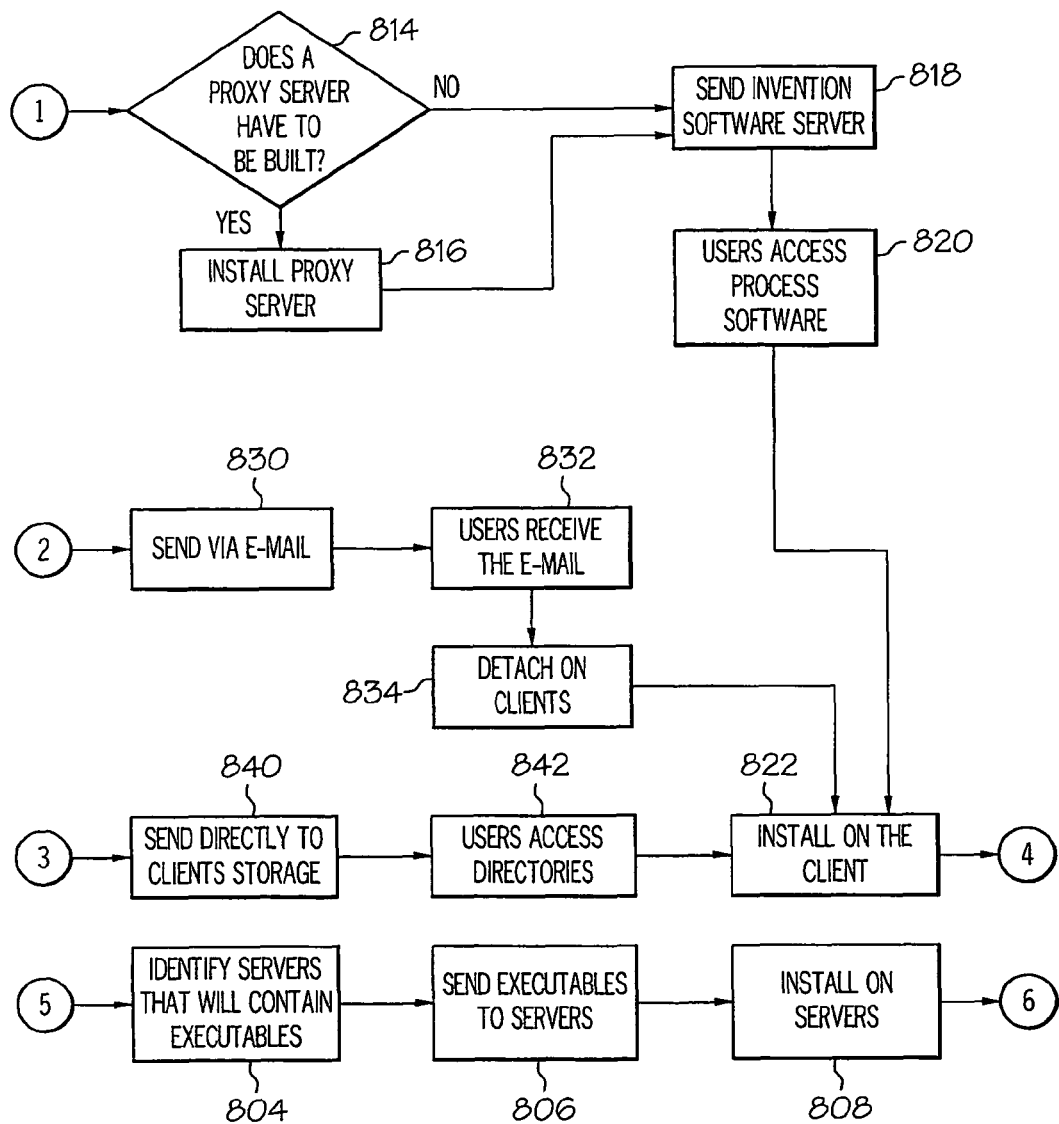

Referring then to FIGS. 8A-8B, step 800 begins the deployment of the process software. The first thing is to determine if there are any programs that will reside on a server or servers when the process software is executed (query block 802). If this is the case, then the servers that will contain the executables are identified (block 804). The process software for the server or servers is transferred directly to the servers' storage via File Transfer Protocol (FTP) or some other protocol or by copying though the use of a shared file system (block 806). The process software is then installed on the servers (block 808).

Next, a determination is made on whether the process software is to be deployed by having users access the process software on a server or servers (query block 810). If the users are to access the process software on servers, then the server addresses that will store the process software are identified (block 812).

A determination is made if a proxy server is to be built (query block 814) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (block 816). The process software is sent to the servers either via a protocol such as FTP or it is copied directly from the source files to the server files via file sharing (block 818). Another embodiment would be to send a transaction to the servers that contained the process software and have the server process the transaction, then receive and copy the process software to the server's file system. Once the process software is stored at the servers, the users, via their client computers, then access the process software on the servers and copy to their client computers file systems (block 820). Another embodiment is to have the servers automatically copy the process software to each client and then run the installation program for the process software at each client computer. The user executes the program that installs the process software on his client computer (block 822) then exits the process (terminator block 824).

In query step 826, a determination is made whether the process software is to be deployed by sending the process software to users via e-mail. The set of users where the process software will be deployed are identified together with the addresses of the user client computers (block 828). The process software is sent via e-mail to each of the users' client computers (block 830). The users then receive the e-mail (block 832) and then detach the process software from the e-mail to a directory on their client computers (block 834). The user executes the program that installs the process software on his client computer (block 822) then exits the process (terminator block 824).

Lastly a determination is made as to whether the process software will be sent directly to user directories on their client computers (query block 836). If so, the user directories are identified (block 838). The process software is transferred directly to the user's client computer directory (block 840). This can be done in several ways such as but not limited to sharing of the file system directories and then copying from the sender's file system to the recipient user's file system or alternatively using a transfer protocol such as File Transfer Protocol (FTP). The users access the directories on their client file systems in preparation for installing the process software (block 842). The user executes the program that installs the process software on his client computer (block 822) and then exits the process (terminator block 824).

VPN Deployment

The present software can be deployed to third parties as part of a service wherein a third party VPN service is offered as a secure deployment vehicle or wherein a VPN is build on-demand as required for a specific deployment.

A virtual private network (VPN) is any combination of technologies that can be used to secure a connection through an otherwise unsecured or untrusted network. VPNs improve security and reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e. the software resides elsewhere) wherein the lifetime of the VPN is limited to a given period of time or a given number of deployments based on an amount paid.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider (ESP) sets a network access server (NAS) and provides the remote users with desktop client software for their computers. The telecommuters can then dial a toll-free number or attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a company's multiple fixed sites over a public network such as the Internet.

The process software is transported over the VPN via tunneling which is the process of placing an entire packet within another packet and sending it over a network. The protocol of the outer packet is understood by the network and both points, called tunnel interfaces, where the packet enters and exits the network.

Software Integration

The process software which consists of code for implementing the process described herein may be integrated into a client, server and network environment by providing for the process software to coexist with applications, operating systems and network operating systems software and then installing the process software on the clients and servers in the environment where the process software will function.

The first step is to identify any software on the clients and servers, including the network operating system where the process software will be deployed, that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists match the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

On Demand

The process software is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the accessed server may make requests of other servers that require CPU units. CPU units describe an example that represents but one measurement of use. Other measurements of use include but are not limited to network bandwidth, memory utilization, storage utilization, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory utilization, storage utilization, etc. approach a capacity so as to affect performance, additional network bandwidth, memory utilization, storage etc. are added to share the workload.

The measurements of use for each service and customer are sent to a collecting server that sums the measurements of use for each customer for each service that was processed anywhere in the network of servers that provide the shared execution of the process software. The summed measurements of use are periodically multiplied by unit costs and the resulting total process software application service costs are alternatively sent to the customer and/or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 9A:
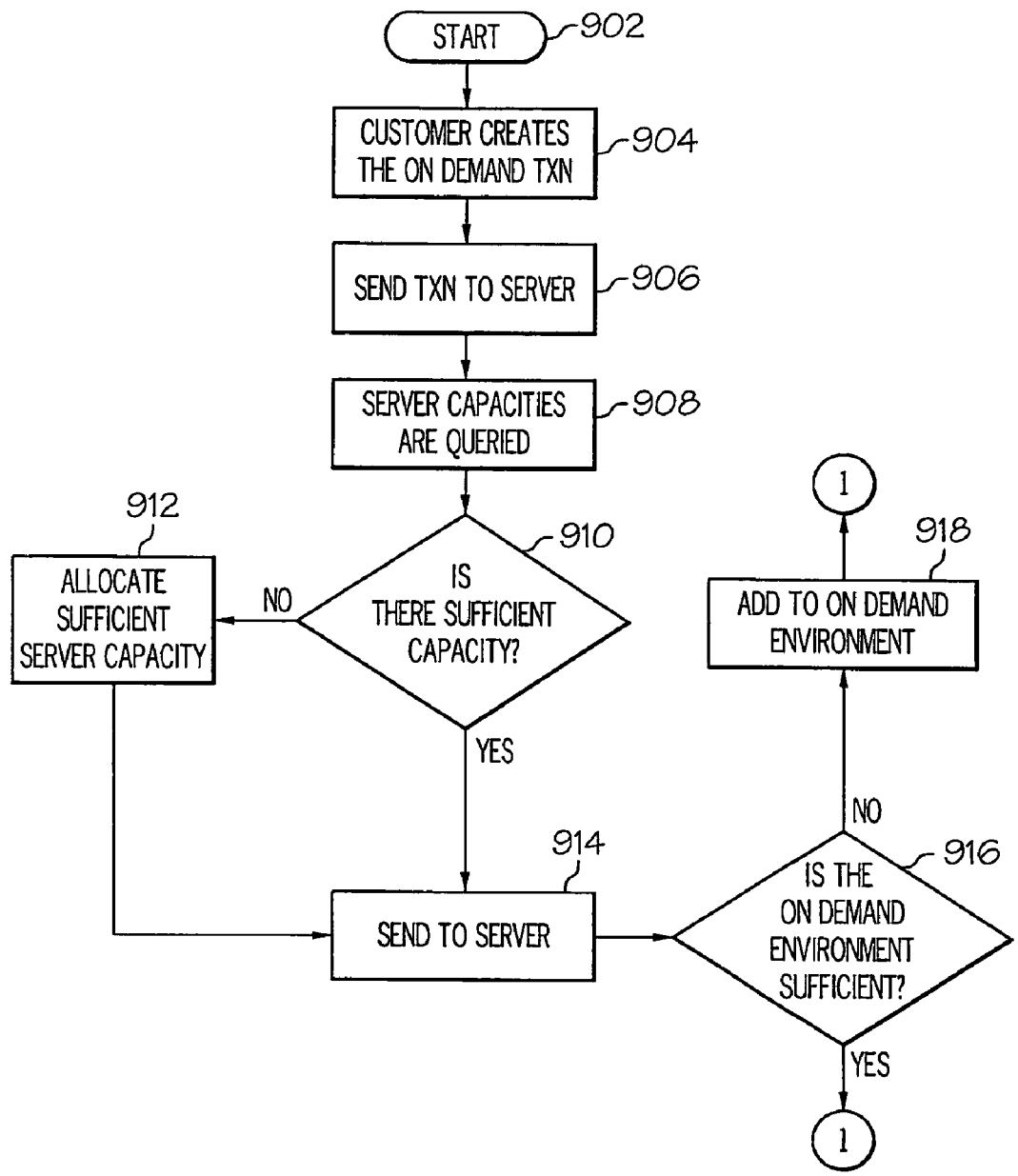
FIGS. 9A-9B are flow-charts showing steps taken to execute the steps and processes shown in FIGS. 2-7 using an on-demand service provider.
Figure 9B:
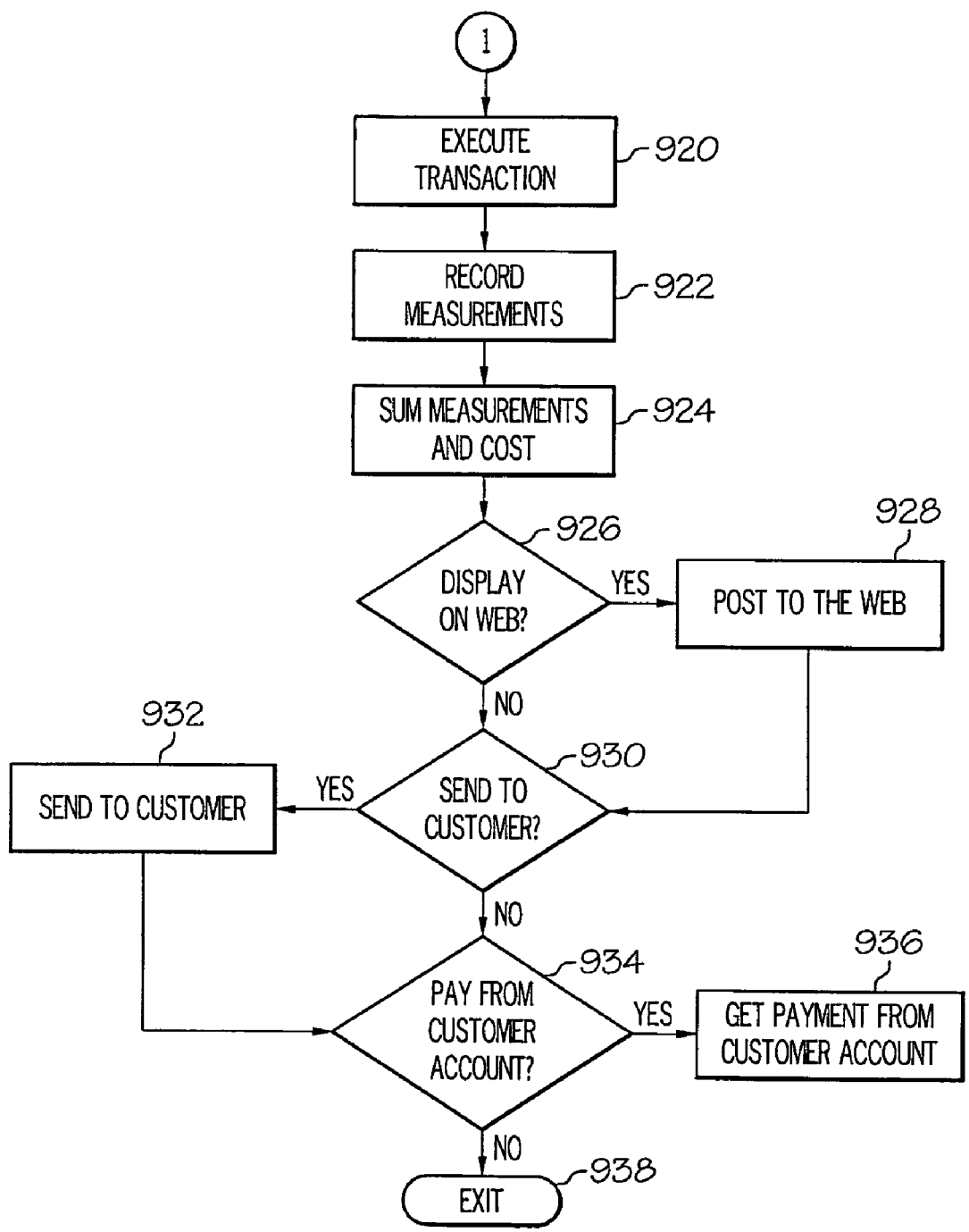

With reference now to FIGS. 9A-9B, initiator block 902 begins the On Demand process. A transaction is created than contains the unique customer identification, the requested service type and any service parameters that further, specify the type of service (block 904). The transaction is then sent to the main server (block 906). In an On Demand environment, the main server can initially be the only server, then as capacity is consumed other servers are added to the On Demand environment.

The server central processing unit (CPU) capacities in the On Demand environment are queried (block 908). The CPU requirement of the transaction is estimated, then the server's available CPU capacity in the On Demand environment are compared to the transaction CPU requirement to see if there is sufficient CPU available capacity in any server to process the transaction (query block 910). If there is not sufficient server CPU available capacity, then additional server CPU capacity is allocated to process the transaction (block 912). If there was already sufficient available CPU capacity then the transaction is sent to a selected server (block 914).

Before executing the transaction, a check is made of the remaining On Demand environment to determine if the environment has sufficient available capacity for processing the transaction. This environment capacity consists of such things as but not limited to network bandwidth, processor memory, storage etc. (block 916). If there is not sufficient available capacity, then capacity will be added to the On Demand environment (block 918). Next the required software to process the transaction is accessed, loaded into memory, then the transaction is executed (block 920).

The usage measurements are recorded (block 922). The utilization measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer (block 924).

If the customer has requested that the On Demand costs be posted to a web site (query block 926), then they are posted (block 928). If the customer has requested that the On Demand costs be sent via e-mail to a customer address (query block 930), then these costs are sent to the customer (block 932). If the customer has requested that the On Demand costs be paid directly from a customer account (query block 934), then payment is received directly from the customer account (block 936). The On Demand process is then exited at terminator block 938.

As described herein, the present invention distributes the signal and data processing for electric grid line sensors across a hierarchical, heterogeneous set of RTU's and substation servers, allowing standard RTU's to provide what data they can while simultaneously allowing advanced "smart" RTU's to provide higher speed sampling and advanced calculations at higher reporting rates. The invention provides for servers located inside electric substations to act as distributed communications masters to scan local subsets of RTU's (organized by distribution feeder circuits) and to deliver the RTU data directly to substation server applications that combine the line sensor RTU calculations and data with data originating in the substation, perform even more advanced calculations and then hand off the results with minimum latency to localized analytics rules engines. The local (substation) rules engines can then perform analyses that can be acted upon directly at the substation level, and/or can be passed on to the utility control center for further processing, action, and/or logging. Line sensor RTU's may be scanned by more than one substation server and no centralized scan control is necessary.

The present invention offers multiple novel and unexpected improvements over the prior art, including: the ability to support mixed smart and standard RTU's, sample rates, reporting rates, and varied subsets of RTU calculation capabilities in one system; the ability to combine signal sampling, signal processing, parameter calculations, and event processing into a single scalable, hierarchical architecture that supports large numbers of analytics on multiple synchronized time scales with geospatial distribution and intelligence distribution, as opposed to using a centralized architecture that scans slowly and without good time synchronization; the ability to deliver line sensor data and results to substations with minimal latency, thus enabling substation control functions not possible in traditional SCADA/DMS systems (example: modifying circuit breaker recloser cycles in real time, meaning milliseconds); the ability to provide increased analytics reliability through distributed architecture (failure of one server or communication path does not take down all analytics, as is the case in a centralized system approach; the ability to support advanced autonomous substation operations, such as automated load rollover and high impedance fault mitigation; and the ability to stream raw waveform data over TCP/IP networks in real time to a client program (remote virtual oscilloscope/vectorscope) and to capture waveform snapshots and store them in standard file formats.

As described above, these advantages are accomplished by an architecture that connects line sensor RTU's directly to (possibly multiple) substation servers that perform RTU scanning, thus achieving independence from a central Supervisory Control and Data Acquisition (SCADA) systems and/or Distributed Management Systems (DMS); an architecture that provides distributed processing of line sensor data, where some processing is performed in the RTU and some at the substations (and even some at the control center); software to perform basic RTU calculations (such as RMS current and voltage, real and reactive power, and THD), and advanced calculations such as Teager-Kaiser energy operator (used to calculate the energy in a signal), k-factor (weighting of harmonic load currents in a distribution line according to the harmonic load currents' effects on transformer heating), impedance phasors, voltage and current phasors, and interphasor angles, and synchrophasors; an architecture that provides for use of a mixed set of variable capability RTU's; a signal processing architecture for smart RTU's that supports extensive high speed calculations on high resolution line sensor sampled data, as well as software for waveform streaming and display; a signal processing architecture the provides partitioning of calculations across a combination of RTU and substation analytics server; a server/RTU architecture that allows computations to be updated or changed without the need to physically re-visit the RTU's or the substation servers; and the use of GPS timing to accurately time stamp data, enabling advanced grid analysis tools, such as synchrophasors.

While the present invention has been particularly shown and described with reference to a preferred embodiment, it will be understood by those skilled in the art that various changes in form and detail may be made therein without departing from the spirit and scope of the invention. For example, while the present description has been directed to a preferred embodiment in which custom software applications are developed, the invention disclosed herein is equally applicable to the development and modification of application software. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system that is configured to process, transmit receive, capture and/or store data.

What is claimed is:

1. A method of monitoring power distribution, on an electric power grid, using intelligent Remote Terminal Units (RTUs), wherein the intelligent RTUs perform autonomous analytics of sensor data taken from electrical distribution lines of the electric power grid, the method comprising:
   acquiring sensor data from an electrical distribution line, included in the electrical distribution lines, using an intelligent RTU that is included in the RTUs;
   locally performing analytics on the sensor data by the intelligent RTU to create a processed data signal, wherein the analytics include determining a power factor of power on the electrical distribution line; and
   transmitting the processed data signal to a control center server to allow a monitoring of power distribution on the electric power grid, wherein the intelligent RTU includes event extraction logic for identifying an event that is indicated by the sensor data and an event correlation engine for correlating the event with events identified by other of the RTUs to recognize problems in the electric power grid that effect multiple of the RTUs.

2. The method of claim 1, wherein the intelligent RTU includes calculation logic for performing analytical analysis of the sensor data.

3. The method of claim 2, wherein the analytical analysis includes determining an energy level of power being distributed on the electrical distribution line using a Teager-Kaiser energy operator.

4. The method of claim 2, wherein the analytical analysis performed by the intelligent RTU includes determining a k-factor of electrical power being transmitted on the electrical distribution line, wherein the k-factor is a weighting of harmonic load currents in the electrical distribution line according to harmonic load current effects on transformer heating.

5. The method of claim 2, wherein the analytical analysis performed by the intelligent RTU includes digitizing an electric power waveform measured by the intelligent RTU, and wherein the method further comprises:
   streaming digitized electric power waveforms to a control center server for real-time display of the digitized electric power waveform measured by the intelligent RTU.

6. An intelligent Remote Terminal Unit (RTU) coupled to an electrical distribution line of an electric power grid, the intelligent RTU comprising:
   a sensor for detecting sensor data, wherein the sensor data describes a property of electric power that is being transmitted on the electrical distribution line;
   a signal processor for autonomously performing analysis of the electric power to create a processed power signal, wherein the analysis includes include determining a power factor of the electric power on the electrical distribution line; and
   a transmitter for transmitting the processed power signal to a control center server, wherein the signal processor implements event extraction logic for identifying an event that is indicated by the sensor data and an event correlation engine for correlating the event with events identified by other RTUs of the electric power grid to recognize problems in the electric power grid that effect multiple RTUs of the electric power grid.

7. The intelligent RTU of claim 6, further comprising calculation logic for performing analytical analysis of the sensor data.

8. The intelligent RTU of claim 7, wherein the analytical analysis includes determining an energy level of power being distributed on the electrical distribution line using a Teager-Kaiser energy operator.

9. The intelligent RTU of claim 7, wherein the analytical analysis performed by the intelligent RTU includes determining a k-factor of electrical power being transmitted on the electrical distribution line, wherein the k-factor is a weighting of harmonic load currents in the electrical distribution line according to harmonic load current effects on transformer heating.

10. The intelligent RTU of claim 7, wherein the analytical analysis performed by the intelligent RTU includes digitizing an electric power waveform measured by the intelligent RTU to create a streamable digitized electric power waveform for real-time transmission to the control center server.

11. A non-transitory computer-readable medium on which is stored a computer program, the computer program comprising computer executable instructions that, when executed on a data processing system, are configured for:
   acquiring sensor data from an electrical distribution line using an intelligent RTU;
   locally performing analytics on the sensor data by the intelligent RTU to create a processed data signal, wherein the analytics include determining a power factor of power on the electrical distribution line; and
   transmitting the processed data signal to a control center server to facilitate monitoring of power distribution on an electric power grid that includes the electrical distribution line, wherein the computer-readable medium is a computer-readable storage medium, and wherein the intelligent RTU comprises event extraction logic for identifying an event that is indicated by the sensor data and an event correlation engine for correlating the event with events identified by other RTUs of the electric power grid to recognize problems in the electric power grid that effect multiple RTUs of the electric power grid.

12. The computer-readable medium of claim 11, wherein the intelligent RTU comprises calculation logic for performing analytical analysis of the sensor data.

13. The computer-readable medium of claim 11, wherein the analytical analysis includes determining an energy level of power being distributed on the electrical distribution line using a Teager-Kaiser energy operator.

14. The computer-readable medium of claim 13, wherein the analytical analysis performed by the intelligent RTU includes determining a k-factor of electrical power being transmitted on the electrical distribution line, wherein the k-factor is a weighting of harmonic load currents in the electrical distribution line according to harmonic load current effects on transformer heating.

15. The computer-readable medium of claim 13, wherein the analytical analysis performed by the intelligent RTU includes digitizing an electric power waveform measured by the intelligent RTU to create a streamable digitized electric power waveform for real-time transmission to the control center server.

16. The computer-readable medium of claim 11, wherein the computer-readable medium is a component of a remote server, and wherein the computer executable instructions are deployed to a supervisory computer from the remote server.

17. The computer-readable medium of claim 11, wherein the computer executable instructions are provided by a service provider to a customer on an on-demand basis.

* * * * *